Dec. 6, 1932.   L. B. GOETZMAN   1,889,892
ALCOHOL CONDENSER FOR USE WITH INTERNAL COMBUSTION ENGINES
Filed Jan. 18, 1932   2 Sheets-Sheet 2
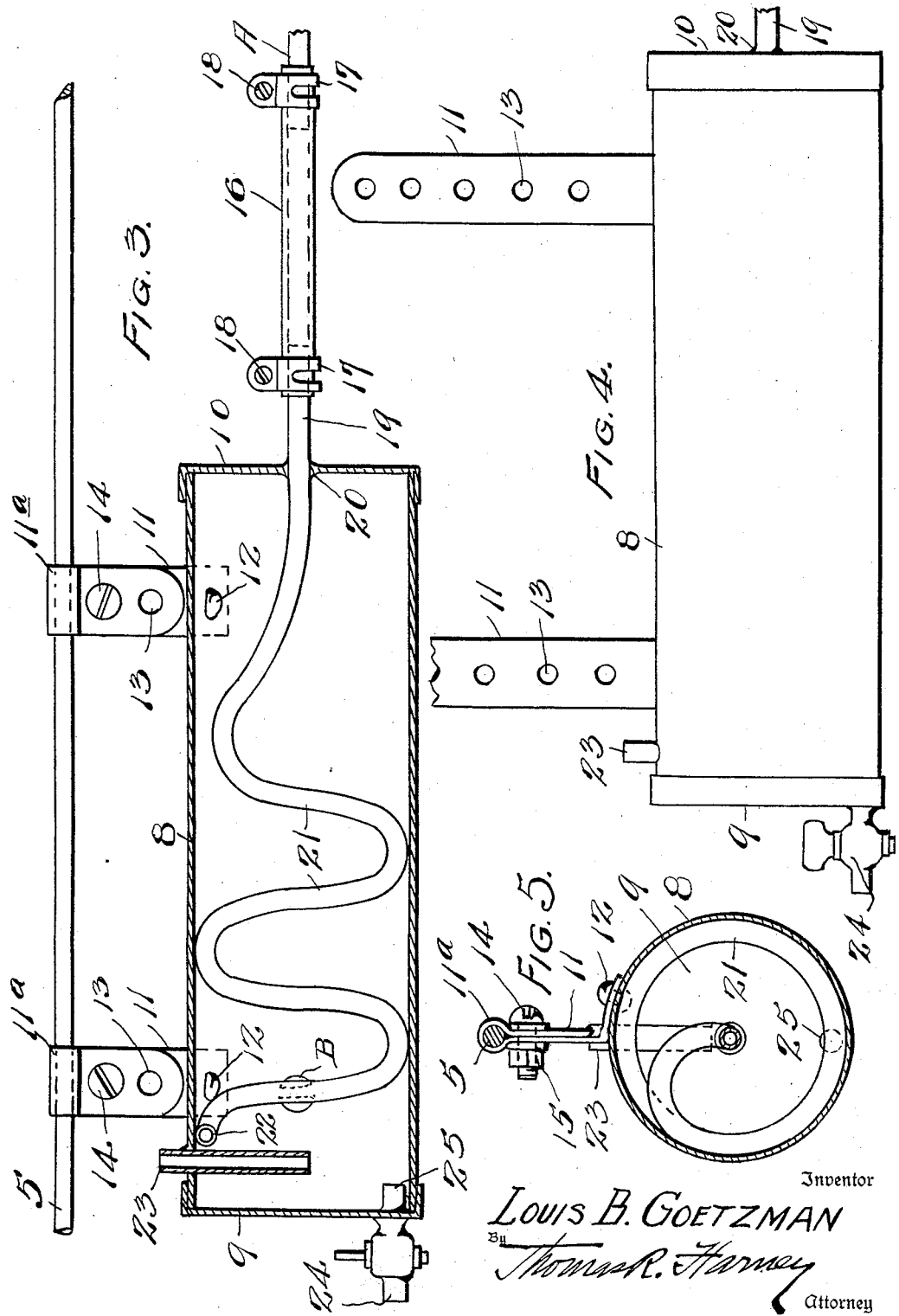
Inventor
Louis B. Goetzman
By Thomas R. Harney
Attorney Patented Dec. 6, 1932

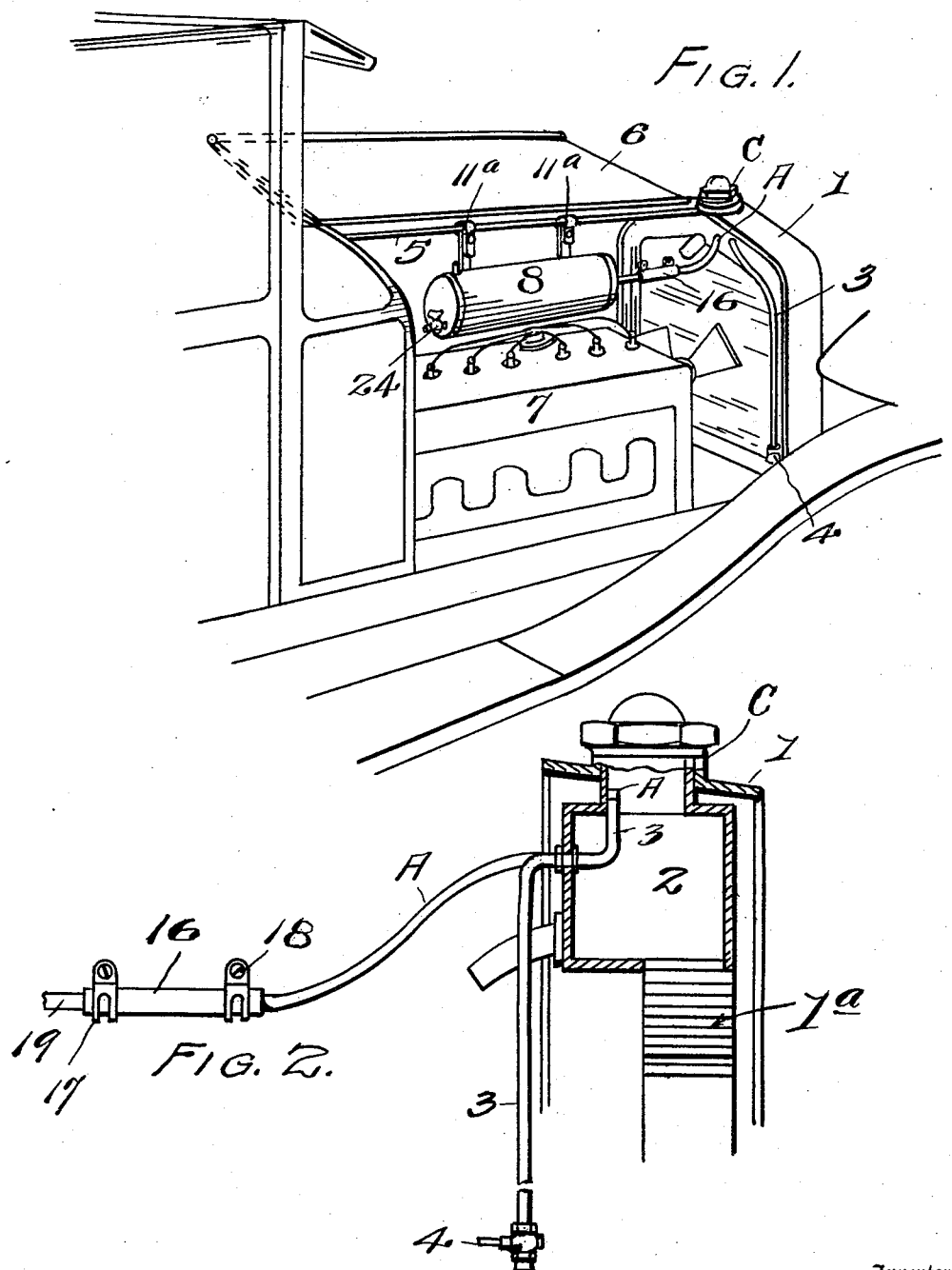

1,889,892

UNITED STATES PATENT OFFICE

LOUIS B. GOETZMAN, OF EAST ST. LOUIS, ILLINOIS, ASSIGNOR OF ONE-HALF TO JOHN H. RIGHTMYER, OF EAST ST. LOUIS, ILLINOIS

ALCOHOL CONDENSER FOR USE WITH INTERNAL COMBUSTION ENGINES

Application filed January 18, 1932. Serial No. 587,326.

My present invention relates to an improved alcohol condenser for use with internal combustion engines, and particularly with such engines employed as motors for passenger automobiles, busses, trucks and other automotive vehicles. As is well known to those familiar with the operation and maintenance of automotive vehicles, alcohol is added, in large or small proportions, to the water employed in the cooling system of the motor, to prevent freezing of the water or mixture during cold weather. In the event that the atmospheric temperature rises as on a warm day, the alcohol in the cooling mixture becomes excessively hot and frequently evaporates, the vapor and expanded hot liquid being lost through the overflow pipe of the radiator, or through leaks that may be caused by the excessively high temperature of the cooling medium. Under these conditions, the alcohol, or other anti-freezing element in the cooling medium, is thus lost, and must be replaced, frequently at high cost.

The primary object of my invention is the provision of means for collecting this vapor from the alcohol, and the overflow from expansion of the hot mixture, and condensing it by cooling and preserving it for further use. Means are provided whereby the condensed cooling medium may be collected in an expansion tank, and subsequently withdrawn from the tank and then returned to the cooling system, thus avoiding loss of the alcohol or other valuable anti-freezing composition, as well as the water for the cooling system.

My invention consists in certain novel combinations and arrangements of parts as will hereinafter be more fully set forth and claimed.

In the accompanying drawings, I have illustrated one complete example of the physical embodiment of my invention, wherein the parts are combined and arranged according to one mode I have devised for the practical application of the principles of my invention. While I have illustrated my invention as installed and adapted for use with a well known type of automobile, it will be understood that changes and alterations may be made in the arrangements of parts for adapting the invention to trucks, busses, and other automotive vehicles, within the scope of my claim, and without departing from the principles of my invention.

Figure 1 is a perspective view showing the front portion of an automobile, with a portion of the hood lifted to disclose the installation of the apparatus of my invention;

Fig. 2 is an enlarged detail sectional view of part of the radiator showing the usual overflow pipe and the auxiliary overflow pipe of my invention, with connections;

Fig. 3 is a longitudinal sectional view of the expansion tank with the condensing coil therein, illustrating the manner of fastening the tank to a tie rod of the automobile hood;

Fig. 4 is a side view of the expansion tank with its pliable or flexible fastening straps; and Fig. 5 is a transverse sectional view of the expansion tank and condensing coil, showing the manner of supporting the tank.

In order that the general assembly and arrangement of parts may readily be understood, I have indicated in Figure 1 a conventional radiator with its shell 1, and upper tank 2 above the radiator core 1a, and the customary overflow pipe 3 passes through the side wall of the upper tank 2 and terminates as usual within or just below the radiator cap C. In the installation of my invention with the radiator, I provide a cut-off valve 4, at the end of the overflow pipe, and while the apparatus of my invention is in use, this cut-off valve is closed to prevent passage of the cooling medium therethrough.

In the illustrated adaptation of my invention, I utilize the tie rod 5 of the hood 6 and, as here shown, the apparatus is located above the motor 7 and below the hood 6, but it will be understood that other arrangements may be made and the parts located in different positions, when desired or necessary.

In carrying out my invention, I employ an expansion tank 8 of suitable shape and having closed ends 9 and 10. The tank may vary in size to suit different conditions, such as the quantity of the cooling medium employed, and it may be of various shapes for the same purpose.

As illustrated in Figures 1, 3 and 5, the expansion tank is supported or suspended from the tie rod 5 by means of a pair of straps 11, 11, fashioned of pliable material in order that they may readily be bent to desired shape, and one end of each of these straps is riveted at 12 to the top portion of the tank 8, or otherwise secured. Each strap is provided with a series of holes 13, and it will be apparent that the straps may be bent over the tie rod to form supporting sleeves 11a, 11a, after which the bent portions of each strap are secured or clamped together by means of bolts 14, passed through registering holes 13 of the straps, and the nuts 15. In this manner, the expansion tank is rigidly supported from the tie rod, and the two wide bearing-supports for the tank prevent displacement, as well as eliminate rattling of parts.

The expansion tank is connected to the auxiliary overflow pipe A by means of a flexible tube 16, of rubber or other suitable material, and the length of this tube is governed by the location of the expansion tank with relation to the radiator. The tube also provides a flexible connection between the radiator and the expansion tank to compensate for relative movements and vibrations of these parts.

The flexible connecting tube is provided with a pair of split clamp rings 17 and bolts or clamp screws 18, and these clamp rings secure one end of the tube to the overflow pipe A, while the other end of the tube is secured on the nipple 19, that projects through the head 10 of the expansion tank and is soldered or welded to the head as at 20.

The projecting nipple 19 is an integral part of a pipe which is fashioned as a condensing coil 21, within the interior of the expansion tank 8, and this coil terminates at 22 near the rear end of the tank and in its upper portion. The coil is welded or soldered to the interior face of the wall of the tank, as at B in Figure 3, and this rigid connection B with the tank, together with the similar connection between the pipe and tank-head at 20, prevents relative movement of these parts, thereby eliminating rattling and displacement of the parts.

Near the rear end of the expansion tank, a vent pipe 23 is provided which is located at the top of the tank, with its inner end terminating a suitable distance above the bottom of the tank to prevent escape of liquid due to splashing within the tank.

At the rear end of the tank, a drain valve 24 is provided and the drain pipe 25 of the valve projects through the head 9 of the tank near the bottom thereof, as indicated in Figure 3. When the apparatus is in use for condensing the vapors and collecting the expanded cooling medium, this valve is closed as in Figure 3. When the collecting cooling medium is to be drawn off from the expansion tank, the valve is opened as in Figure 4.

From the above description taken in connection with my drawings, it will be apparent that when the cooling medium becomes excessively heated and evaporates, the vapor will pass through the auxiliary overflow pipe A and tube 16 to the condensing coil 21 in the tank, and the latter may be cooled by draft from the motor-fan or by air currents caused by the traveling automobile. The condensed vapor passes through the coil and out through the outlet 22 to the interior of the expansion tank. The liquid cooling-medium, which may be vaporized by excessive heat from the motor, also passes through the auxiliary overflow pipe to the expansion tank, where the liquid is collected. The capacity of the expansion tank of course depends upon the volume or quantity of the liquid employed in the radiator system, and dangerous conditions are avoided by the provision of the vent tube or pipe 23.

The collected liquid may be drawn off from the expansion tank through the drain valve 24 into a receptacle, and then the liquid may be returned to the radiator system through the inlet in usual manner, after the radiator cap C is removed.

It will be evident that the apparatus of my invention is quite simple in construction; may with facility be installed for use without materially altering the existing cooling system of the motor; and the apparatus provides an efficient and economical means for preserving the alcohol, or other similar antifreeze medium, employed in the cooling system.

Having thus fully described my invention, what I claim as new and desire to secure by Letters Patent is—

The combination in a condensing apparatus for use with the overflow pipe of an automobile radiator, of an expansion tank having a vent and clamping means on the tank for attachment to a support, a condensing coil having an open end in the upper portion of the tank and means for rigidly securing the coil to the tank, an exterior integral nipple on the coil, an outlet valve mounted in one end of the tank, a flexible tubular connection and means for clamping said connection on the nipple, and means on the tubular connection for clamping said connection to the overflow pipe.

In testimony whereof, I have affixed my signature.

LOUIS B. GOETZMAN.